Patented June 26, 1951

2,558,234

UNITED STATES PATENT OFFICE 2,558,234

PROCESS FOR MANUFACTURE OF CANDY COATED APPLES OR THE LIKE

Joseph Almer Canfield, Seattle, Wash.

No Drawing. Application June 19, 1950,
Serial No. 169,075

5 Claims. (Cl. 99—134)

This invention relates to a new and improved process for manufacture of caramel coated apples or the like and has for its general object a process resulting in candy coated apples suited for merchandising by general methods not previously applicable to this type of product.

As manufactured by previous methods, it has usually been necessary to merchandise this type of confection by sales directly at the place of manufacture, such as picnic grounds or carnival concessions or the like, and within a short period of time, usually not longer than one-half day, after the apples were dipped in the coating material. Being quickly perishable and sticky, for instance, they could not be satisfactorily merchandised in sanitary containers or otherwise, through candy stores or similar merchandising outlets and by methods generally used with ordinary confectionary products.

A more specific object of the invention is a process for producing relatively non-perishable carameled apples suited for general merchandising in cellophane bags or similar sanitary containers without sticking to the container even after days or weeks of storage therein.

Still another object is a process from which the carameled apples emerge without appreciable cooking of the meat directly under the skin of the fruit, and with a coating which sets up quickly after dipping and does not flow, is not sticky, does not become hard and brittle, adheres very well to the apple and does not break up and fall off after part is bitten off.

The usual tendency for apples to cook appreciably from the heat of the dipping bath is avoided herein by the preparation of a caramel coating formula permitting the apples to be dipped at relatively low temperatures. A low temperature bath also minimizes the waiting period after dipping, before the coated apples may be packaged.

My improved process, which is the result of a great many experiments, may be discussed conveniently by reference to its three major phases. The first phase comprises the preparation and cooking of the base formula. In the second phase, the base formula is allowed to cool toward dipping temperature, and a conditioner fondant is added. The third phase includes the step of dipping the fruit in the coating bath maintained at relatively low temperature.

In general, certain steps and ingredients in the overall process are more or less critical and have a definite bearing on essential qualities of the product, although it will be understood that within the limitations hereinafter set forth, certain minor variations may be employed without departing from the method.

*Preparation of base formula*

A preferred base formula is prepared by mixing together and heating while slowly stirring the following named ingredients in the proportions by weight stated opposite each:

| | |
|---|---|
| Commercial glucose or corn syrup | 160 |
| Commercial cream | 32 |
| Whole milk | 32 |
| Table salt | 10 |
| Brown sugar | 128 |
| White sugar | 128 |
| Hard fat (such as margarine, or higher melting fraction coconut oil 96° F. melting point) | 32 |
| Evaporated milk | 112 |

The hard fat is added and stirred in more conveniently after the ingredients named above it in the list have been heated to such a temperature that the fat melts quickly.

The evaporated milk is added when the mixture of the other named ingredients has been heated to the boiling point, which will occur in about 12 minutes in the case of the above mixture if, for example, the numbers indicating the parts by weight of the different ingredients represent ounces and the mixture is heated in a kettle over an ordinary candy furnace. If the evaporated milk is added before the mixture reaches the boiling point, it has a tendency to curdle.

After the resulting mixture reaches the boiling point and the hard fat and evaporated milk have been added, its temperature is gradually raised to about 238° F. to insure driving off most of the water. Under the conditions just specified, this requires about sixteen minutes of steady boiling. When this higher temperature is reached, flavoring and coloring may be added, if desired, thereby completing the basic formula, which is then allowed to cool preparatory to the second main phase in the overall prcoess.

The glucose is an inexpensive sweetening agent which gives body to the mixture and imparts a plastic quality to the final coating. It is an important base ingredient in the formula. The amount of glucose may be moderately varied without serious adverse effect.

The cream and whole milk as ingredients of the base formula function as wettings and add richness and creaminess to the final product. However, they are not critical items. For example, instead of employing equal parts of cream and whole milk, the total weight of both may be made up of different proportions of milk and cream, or entirely of cream, or entirely of whole milk, assuming different degrees of richness and creaminess are desired or tolerable. The evaporated milk is employed for increased richness and creaminess at minimum expense. While plain water may be used as a wetting, unless milk or cream are present in some appreciable degree, the amount depending on the desired richness of the product, the resulting product tends to be grainy or coarse, a characteristic which is not overcome entirely by the presence of fondant added later. On the other hand, an excess in the total proportion of milk and cream, such as above perhaps 10% more by weight than the total of the stated amounts, results in a coating which does not set up.

The proportion of table salt selected is not critical and will depend, of course, upon the flavor desired. In the event a salted hard fat is employed in the base formula, less table salt would be added than in other cases.

While in the above base formula granulated sugar is employed in two forms, brown and white in equal quantities, it will be understood that all white sugar may be used, or all brown sugar. All white sugar would be employed if the flavoring and coloring of brown sugar were not desired, as when special artificial flavoring and coloring are to be added to the mixture. Thus while granulated sugar in approximately the total quantity stated is an important or necessary part of the base formula, a 10% variation up or down being tolerable, the type of granulated sugar is not critical. A deficiency in granulated sugar content of the formula cannot be made up by glucose in appreciable quantities without causing stickiness and stringiness in the final coating. Nor is powdered sugar satisfactory.

The hard fat as an ingredient in the base formula is an important item and cannot be greatly decreased without causing dryness and brittleness in the final coating. If the proportion by weight of hard fat is decreased by more than 10%, for example, that difficulty becomes serious. On the other hand, the proportion by weight of hard fat cannot be excessively increased without causing a kind of oiliness in the final coating. When that occurs, the coating tends to slip off the apple instead of adhering tenaciously to the skin of the fruit as desired. Here again if the increase is more than about 10%, this latter difficulty becomes serious.

The hard fat used may be any of the edible stiff types which are used by candy makers, for example, in the practice of their art. The important function of the hard fat in the base formula and ultimately in the final product is considered to be that of producing plastic softness enabling the coating to be bitten through readily, but without giving it a sticky or stringy property. Furthermore, together with the sugar and the fondant (added later), the hard fat causes the final coating to set up rapidly with the desired stiffness, and without flowing.

Conditioning by addition of fondant

After the base formula prepared as described above has cooled from its maximum temperature in the vicinity of 238° F. to a temperature preferably well below 200° F., a fondant is folded or stirred thoroughly into the mixture. In the illustrative case, 240 parts by weight of fondant are employed. Preferably the fondant used is a heavy or "icing fondant," being made up of the following ingredients, with the proportions by weight stated opposite each:

| | |
|---|---|
| Sucrose | 197 |
| Commercial glucose or corn syrup | 18 |
| Invert sugar syrup (commercial "Nulomoline," a product of the American Molasses Co. of New York) | 25 |

These ingredients are heated to crystallization and are then stirred or beat into a creamy, thick mass of a consistency noticeably harder than the candy cream filler fondants usually employed in cream center candies. The invert sugar syrup used in the fondant is prepared from sucrose and water boiled with an acid, which changes the sucrose into two simpler sugars.

The fondant or conditioner employed in the process is a very important ingredient and must be present in an amount not appreciably less than the proportional amount stated. If the fondant is decreased by more than about 10% there is a definite tendency for the final coating to be sticky. On the other hand, the fondant may be increased above the proportional amount named by a somewhat larger percentage without detrimental effect.

While the fondant may be added before the temperature of the mixture cools down below 200° F., for example, it is preferable to wait until it reaches the range between about 165° F. and 185° F. The reason for this is that the fondant tends to break down partly into sucrose under prolonged heat, especially at high temperature, and if the temperature is high initially less time will be available after the fondant is added in which to dip the apples. At 175° F., for example, the fondant will remain in its desired state for about 1½ or 2 hours. If the dipping operation is delayed for a period much longer than this more fondant must be added as a replacement and thoroughly stirred into the mixture. However, there is a limit to the amount of replacement fondant which may be added to the mixture for this purpose, because ultimately the quantity of sugar resulting from the breaking down of the fondant, when added to the original granulated sugar content of the mixture, becomes excessive and the product tends to become course and brittle.

Dipping operation

The base formula is constituted for a low temperature dipping of the apples not only because of the effect of prolonged higher temperatures on breakdown of the fondant, but because of definite other advantages. By maintaining the temperature of the conditioned base formula in the range between about 165° F. and 185° F., for example, the apples can be dipped and removed at a convenient pace without cooking the meat of the apple under the skin. If the temperature of the mixture is too high, the apple will be cooked and will spoil rapidly. Moreover the mixture will be too thin and tend to run off the apple before it sets. On the other hand, if the dipping temperature of the mixture is too low, such as below 160° F. the mixture, then not greatly above the temperature at which it fairly sets, will be too stiff for satisfactory dipping of the apples.

The confectionary coatings produced by the illustrative process are of an especially delectable quality, resembling caramel and yet also have a creamy fudge-like quality. The freshly coated apples may be sold and eaten immediately, or under room drying conditions may be packaged, if desired, in a matter of several hours following the dipping operation, and are then ready for mechandising through ordinary trade channels or otherwise.

I claim as my invention:

1. The process of manufacturing candy coated apples and like products, comprising preparation of a base formula by stirring and cooking a mixture comprising approximately equal units by weight of commercial glucose and granulated sugar, about one-third unit of hard fat, a wetting, a dairy product enrichener and salt, heating such mixture to a temperature somewhat above boiling to insure removal of most water, allowing the mixture to cool to a substantially lower temperature, then mixing in about one and one-half units of a heavy fondant, and finally dipping the apples in the cooled resultant mixture maintained at a temperature not greatly above that at which the same fairly sets.

2. The process defined in claim 1, wherein evaporated milk is the dairy product enrichener and is added to the mixture upon its reaching boiling temperature.

3. The process defined in claim 2, wherein the fondant comprises approximately 197 parts by weight of sucrose, approximately 18 parts by weight of commercial glucose and approximately 25 parts by weight of invert sugar syrup, heated to crystallization and then stirred into a creamy, thick mass.

4. The process of manufacturing candy coated apples and like products comprising the steps of preparing a base formula by mixing together and heating to boiling, proportionally by weight, 160 parts of commercial glucose, 32 parts of commercial cream, 32 parts of whole milk, approximately 10 parts of table salt, 128 parts of brown sugar, 128 parts of white sugar, and 32 parts of hard fat, adding 112 parts of evaporated milk after the mixture reaches a boil, raising the temperature of the resulting mixture to approximately 233° F., allowing the mixture to cool to a temperature in the range between about 165° F. and 185° F., mixing in about 240 parts of a heavy fondant, and dipping the apples in the mixture while maintaining its temperature within said range.

5. The process defined in claim 4, wherein the fondant comprises a heavy icing fondant prepared by heating to crystallization 197 parts of sucrose, 18 parts of commercial glucose and 25 parts of invert sugar syrup, and thereafter stirring or beating the mixture into a creamy, thick mass.

JOSEPH ALMER CANFIELD.

REFERENCES CITED

The following references are of record in the file of this patent:

"Everybody's Cookbook" by Lord, Revised Edition, Harcourt, Brace and Company, New York, page 397.

"Candy Production: Methods and Formulas," Richmond, The Manufacturing Confectioner, Chicago, Illinois, 1948, pages 329–334.